3,595,865
5-(4-PYRIDYL)-5H-DIBENZO[a,b]CYCLOHEPTENES
John R. J. Sorenson, Morton Grove, and Kurt J. Rorig, Glenview, Ill., assignors to G. D. Searle & Co., Chicago, Ill.
No Drawing. Filed Sept. 12, 1968, Ser. No. 759,495
Int. Cl. C07d 31/20, 31/24
U.S. Cl. 260—290                                    6 Claims

ABSTRACT OF THE DISCLOSURE 5H-dibenzo[a,d]cycloheptenes having a 4-pyridyl substituent at the 5-position are described herein. These compounds are prepared from the appropriate dibenzocyclohepten-5-one and 4-pyridyllithium. This reaction gives the corresponding 5-substituted dibenzocyclohepten-5-ol which is then reduced with hydriodic acid to remove the hydroxy group. The present compounds are useful as anti-convulsants, anti-ulcer agents, and anti-algal agents, and they inhibit germination of seeds of trifolium.

---

The present invention relates to a group of 5H-dibenzo[a,d]cycloheptenes having a 4-pyridyl substituent at the 5-position. It further relates to the N-oxides of these compounds. More specifically, the present invention relates to a group of compounds having the following general formula

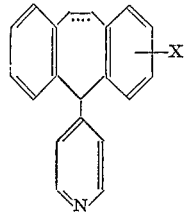

wherein X is selected from the group consisting of hydrogen, halogen, methyl, and methoxy; and the dotted line indicates the optical presence of a double bond. The present invention also encompasses the N-oxides of the aforesaid compounds. The halogen atoms referred to above include fluorine, chlorine, bromine, and iodine.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are useful because of their pharmacological properties. In particular, these compounds are useful as anti-convulsant agents. Thus, like diphenylhydantoin, they antagonize electroshock seizures. The anti-convulsant utility of the present compounds is evident from the results obtained by using a standard procedure which was adapted from that described by E. A. Swinyard et al., J. Pharmacol. and Exp. Therap., 106, 319 (1952). In the procedure, 50 mg./kg. of a compound to be tested is administered intragastrically to each of 10 mice. At a specific time after the administration of the test compound (2.5 hours), each mouse is challenged with a current of 50 milliamperes, delivered via corneal electrodes, for 0.2 second. This current is sufficient to induce maximal electroshock seizures in 100% of control animals. A compound is rated active if the hind limb tonic extensor component of the seizure pattern is abolished in at least 20% of the animals in the group tested. When 5-(4-pyridyl)-10,11-dihydro-5H-dibenzo[a,d]cycloheptene, 2-chloro-5-(4-pyridyl)-5H-dibenzo[a,d]cycloheptene, and 5-(1-oxido-4-pyridyl)-5H-dibenzo[a,d]cycloheptene were tested by the above procedure, they were found to be active as anti-convulsants.

The compounds of the present invention are further useful as anti-ulcer agents. This can be demonstrated by their ability to inhibit ulceration in the Shay rat. The ulceration occurs in rats subjected to fasting and pyloric ligation as reported by Shay et al., Gastroenterology, 5, 43 (1945). In the test, male Charles River rats weighing 200–250 grams and fasted 72 hours prior to ligation are used. Immediately following ligation, the prescribed dose of compound dissolved or suspended in 1.0 ml. of pH 2.0 hydrochloric acid is intragastrically administered to each of a group of 6 animals. A like group of animals receives the acid alone and serves as controls. Precisely 19 hours later, the stomachs of surviving animals are excised and examined under 5× magnification. Any ulcers present are rated according to number and size and a compound found to produce a significant decrease in ulceration compared to the control animals is rated as active. When 2-chloro-5-(4-pyridyl)-10,11-dihydro-5H - dibenzo[a,d]cycloheptene, 5-(4-pyridyl)-5H - dibenzo[a,d]cycloheptene, and 5-(1-oxido-4-pyridyl) - 5H - dibenzo[a,d]cycloheptene were tested at 50 mg. according to this procedure, each produced a significant decrease in ulceration.

The present compounds also possess anti-algal activity. Thus, they inhibit the growth of the organism *Chlorella vulgaris*. In addition, the present compounds also inhibit germination of seeds of Trifolium.

The compounds of the present invention are prepared from an appropriate dibenzocycloheptenone of the formula

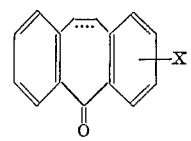

wherein X and the dotted line have the same significance as above. The ketone is allowed to react with an appropriate 4-pyridyl organometallic compound. Particularly preferred for this reaction is 4-pyridyllithium. The indicated reaction gives an alcohol of the formula

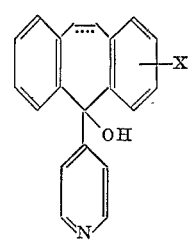

wherein X and the dotted line are defined as above. The resultant alcohol is then reduced, preferably with hydriodic acid, to give the desired compounds of the present invention.

The N-oxides of the present invention are prepared from the appropriate pyridyl compound. This is reacted with an oxidizing agent, such as 30% hydrogen peroxide, to give the desired oxide.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

An ether solution containing 7.6 parts of 1-bromobutane is added portionwise over a period of 1 hour to 0.76 part of lithium which is covered with ether and maintained under an argon atmosphere. The resultant mixture is then stirred for 1 hour and cooled to between —40 and —60° C. Then 7.6 parts of 4-bromopyridine is added followed by an ether suspension of 11.7 parts of 2-chloro - 10,11 - dihydro - 5H - dibenzo[a,d]cyclohepten-5-one. The mixture is then stirred for several hours before it is allowed to warm to room temperature and stirred at this temperature for 16 hours. 200 parts by volume of a saturated aqueous solution of ammonium chloride is then added to the mixture and the ether is evaporated. The solid which forms is separated by filtration and recrystallized from hexane. The resultant solid is then redissolved in ether and dried over magnesium sulfate, and the solvent is removed. The residue is recrystallized from hexane to give 2-chloro-5-(4-pyridyl)-10,11-dihydro - 5H - dibenzo[a,d]cycloheptene-5-ol melting at about 201–202° C. This compound has the following formula

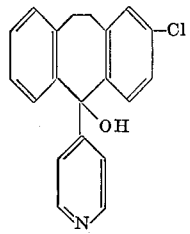

EXAMPLE 2

A solution of 5.8 parts of 2-chloro-5-(4-pyridyl)-10,11-dihydro - 5H - dibenzo[a,d]cyclohepten - 5 - ol in 25.5 parts of hydriodic acid, 6 parts of concentrated hydrochloric acid, and 16 parts of glacial acetic acid is refluxed for 3 hours. The mixture is then cooled to room temperature and poured into a solution of 5.3 parts of sodium bisulfite in 40 parts of water. It is then made alkaline with an aqueous 40% sodium hydroxide solution until a brown oily layer separates. The mixture is then extracted with ether and the ether extracts are dried over magnesium sulfate and treated with charcoal. Evaporation of the ether solvent leaves a red oil which is 2-chloro-5-(4-pyridyl)-10,11-dihydro - 5H - dibenzo[a,d] cycloheptane. The oil is then dissolved in anhydrous ether and hydrogen chloride gas is bubbled through the solution until precipitation is complete. The precipitate which forms is separated by filtration to give 2-chloro-5-(4-pyridyl) - 10,11 - dihydro - 5H - dibenzo[a,d]cycloheptene hydrochloride melting at about 255–260° C. with decomposition. The free base of this compound has the following formula

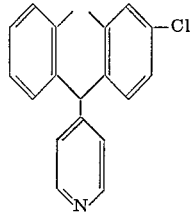

EXAMPLE 3

A solution of 23 parts of 1-bromobutane in 70 parts of ether is added portionwise to 2.3 parts of lithium which is covered with 35 parts of dry ether and maintained at 0° C. under an atmosphere of argon. Then, an ether solution of 23.1 parts of 4-bromopyridine is added portionwise to the mixture which is then cooled to —60° C. An ether suspension of 30 parts of 5H-dibenzo[a,d] cycloheptene-5-one is added to the mixture at —60° C. and the resultant mixture is stirred at that temperature for 3.5 hours before it is warmed to room temperature. It is then stirred at room temperature for 3.5 hours before it is neutralized with aqueous 25% ammonium chloride solution. The ether is then evaporated and the remaining mixture is filtered to separate the precipitated solid. This is recrystallized from a mixture of hexane and acetone to give 5-(4-pyridyl) - 5H - dibenzo[a,d]cyclohepten-5-ol melting at about 219–220° C.

EXAMPLE 4

A solution of 15 parts of 5-(4-pyridyl)-5H-dibenzo-[a,d]cyclohepten-5-ol in 78 parts of concentrated hydriodic acid, 18 parts of concentrated hydrochloric acid, and 185 parts of glacial acetic acid is heated to 90° C. with stirring. The mixture is then cooled to room temperature and dissolved in a mixture of water and acetone. 35 parts of sodium bisulfite is added and the mixture is neutralized with aqueous 40% sodium hydroxide solution. The solid which forms is separated by filtration and leached with hexane. The combined hexane leachings are concentrated to about one-half the original volume and allowed to stand. A precipitate forms and is separated by filtration and dried under reduced pressure to give 5-(4 - pyridyl)-5H-dibenzo[a,d]cycloheptene melting at about 144–145° C. This compound has the following formula

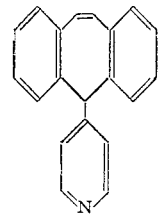

EXAMPLE 5

The procedure of Example 3 is repeated using 34.5 parts of 3-chloro-10,11-dihydro - 5H - dibenzo[a,d]cyclohepten-5-one and the 4-pyridyllithium obtained from 23.1 parts of 4-bromopyridine and 2.2 parts of lithium. The product obtained is 3-chloro-5-(4-pyridyl) - 10,11 - dihydro-5H-dibenzo[a,d]cyclohepten - 5 - ol melting at about 232.5–233° C.

The reduction of 11 parts of 3-chloro-5-(4-pyridyl)-10,11 - dihydro - 5H - dibenzo[a,d]cycloheptene - 5 - ol with 62 parts of hydriodic acid, 14 parts of concentrated hydrochloric acid, and 210 parts of glacial acetic acid according to the procedure described in Example 4 gives 3 - chloro - 5 - (4 - pyridyl) - 10,11 - dihydro - 5H-dibenzo[a,d]cycloheptene melting at about 137.5–138.5° C.

EXAMPLE 6

The procedure of Example 3 is repeated using 10 parts of 10,11 - dihydro - 5H - dibenzo[a,d]cycloheptene - 5-one and the 4-pyridyllithium obtained from 0.76 part of lithium metal and 7.6 parts of 4-bromopyridine. The product obtained is 5 - (4 - pyridyl) - 10,11 - dihydro-5H - dibenzo[a,d]cycloheptene - 5 - ol melting at about 190.5-191° C.

The reaction of 103 parts of 5 - (4 - pyridyl) - 10,11-dihydro - 5H - dibenzo[a,d]cycloheptene - 5 - ol with 490 parts of hydriodic acid, 115 parts of cencentrated hydrochloric acid, and 1050 parts of acetic acid according to the procedure described in Example 4 gives 5-(4 - pyridyl) - 10,11 - dihydro - 5H - dibenzo[a,d]cycloheptene melting at about 135–137° C.

EXAMPLE 7

If the procedure of Example 3 is repeated using 37 parts of 1 - chloro - 5H - dibenzo[a,d]cyclohepten - 5-one and the 4-pyridyllithium obtained from 50 parts of 4-bromopyridine hydrochloride, the product is 1 - chloro-5 - (4 - pyridyl) - 10,11 - dihydro - 5H - dibenzo[a,d] cycloheptene-5-ol melting at about 228–230° C. If 20 parts of this alcohol is then reduced with 96 parts of concentrated hydriodic acid, 24 parts of concentrated hydrochloric acid and 105 parts of glacial acetic acid according to the procedure described in Example 4, the product is 1 - chloro - 5 - (4 - pyridyl) - 5H - dibenzo[a,d]cycloheptene melting at about 130–133° C.

EXAMPLE 8

The procedure of Example 3 is repeated using 50 parts of 2 - chloro - 5H - dibenzo[a,d]cycloheptene - 5 - one and the 4-pyridyllithium obtained from 34.8 parts of 4-bromopyridine. In this case, the product is 2 - chloro-5 - (4 - pyridyl) - 5H - dibenzo[a,d]cycloheptene - 5 - ol melting at about 231–232° C. 20 parts of this alcohol is then reacted with 96 parts of concentrated hydriodic acid, 24 parts of concentrated hydrochloric acid, and 105 parts of glacial acetic acid according to the precedure described in Example 4. In this case, the product is 2 - chloro - 5-(4 - pyridyl) - 5H - dibenzo[a,d]cycloheptene melting at about 134.5–136° C.

EXAMPLE 9

If the procedure of Example 3 is repeated using 50 parts of 3 - chloro - 5H - dibenzo[a,d]cycloheptene - 5-one and the 4-pyridyllithium obtained from 49 parts of 4-bromopyridine hydrochloride, the product is 3 - chloro-5 - (4 - pyridyl) - 5H - dibenzo[a,d]cycloheptene - 5 - ol melting at about 240–244° C. The procedure of Example 4 is then repeated using 20 parts of 3 - chloro - 5 - (4-pyridyl) - 5H - dibenzo[a,d]cycloheptene - 5 - ol, 96 parts of concentrated hydriodic acid, 24 parts of concentrated hydrochloric acid, and 105 parts of glacial acetic acid to give 3 - chloro - 5 - (4 - pyridyl) - 5H - dibenzo [a,d]cycloheptene melting at about 276–278° C.

EXAMPLE 10

A mixture of 10 parts of 5 - (4 - pyridyl) - 5H - dibenzo[a,d]cycloheptene and 105 parts of glacial acetic acid is warmed to give a clear solution. To this solution is added 7.5 parts by volume of 30% hydrogen peroxide and the resultant mixture is heated on a steam bath for 2 hours. It is then concentrated to about one-half the original volume under reduced pressure. The remaining mixture is then diluted with an equal volume of distilled water and the liquid is again evaporated, this time to near dryness. The resulting residue is then recrystallized twice from a mixture of acetone and hexane and dried under reduced pressure to give 5 - (1 - oxido - 4 - pyridyl) - 5H-dibenzo[a,d]cycloheptene melting at about 186–190° C. with decomposition. This compound has the following formula

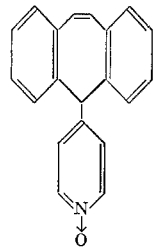

What is claimed is:

1. A compound selected from the group consisting of compounds of the formula

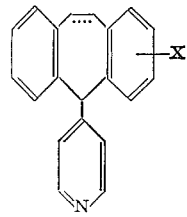

wherein X is selected from the group consisting of hydrogen and chlorine and the dotted line indicates the optional presence of a double bond; and N-oxides of the above compounds.

2. A compound according to claim 1 wherein X is hydrogen and there is a 10,11-double bond, said compound being 5-(4-pyridyl)-5H-dibenzo[a,d]cycloheptene.

3. A compound according to claim 1 which has the formula

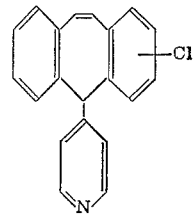

4. A compound according to claim 1 wherein there is a 10,11-double bond and X is 3-chloro, said compound being 3 - chloro - 5 - (4 - pyridyl) - 5H - dibenzo[a,d] cycloheptene.

5. A compound according to claim 1 which is 5-(1-oxide-4-pyridyl)-5H-dibenzo[a,d]cycloheptene.

6. A compound according to claim 1 wherein X is hydrogen and the 10,11-bond is saturated, said compound being 5 - (4 - pyridyl) - 10,11 - dihydro - 5H - dibenzo [a,d]cycloheptene.

References Cited
UNITED STATES PATENTS 3,335,148    8/1967    Krumkalns _____ 260—290
3,317,543    5/1967    Humber _____ 260—290

HENRY R. JILES, Primary Examiner

H. I. MOATZ, Assistant Examiner

U.S. Cl. X.R.

260—297; 424—263

PO-1050
(5/69)

UNITED STATES PATENT OFFICE
CERTIFICATE OF CORRECTION

Patent No. 3,595,865        Dated July 27, 1971

Inventor(s) Kurt J. Rorig and John R. J. Sorensen

It is certified that error appears in the above-identified patent and that said Letters Patent are hereby corrected as shown below:

Column 1, line 42, "optical" should be -- optional --.

Column 4, 1st formula:

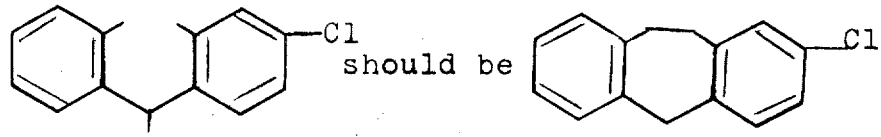

Column 5, line 11, "cencentrated" should be -- concentrated --.

Column 6, line 54, "oxide" should be -- oxido --.

Signed and sealed this 21st day of March 1972.

(SEAL)
Attest:

EDWARD M. FLETCHER, JR.
Attesting Officer

ROBERT GOTTSCHALK
Commissioner of Patents